Figure 1:
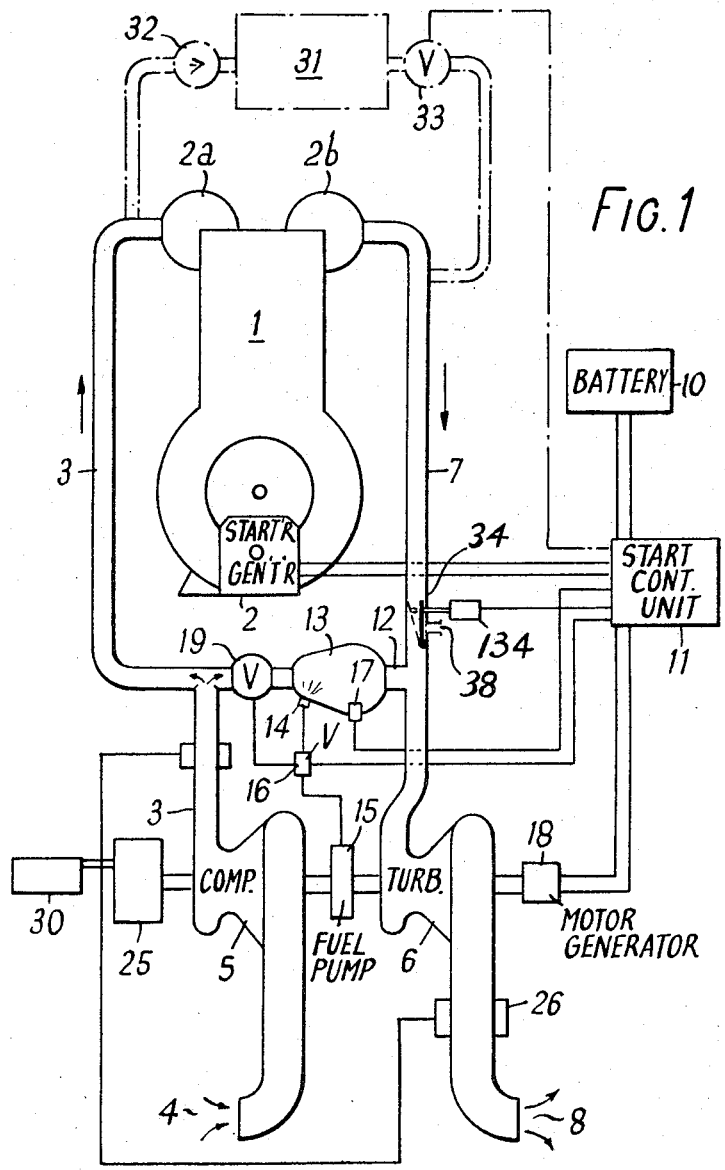

United States Patent
Oldfield

[15] 3,676,999
[45] July 18, 1972

[54] SUPERCHARGING MEANS FOR INTERNAL-COMBUSTION ENGINES

[72] Inventor: Thomas Alfred Oldfield, Warsash, England
[73] Assignee: The Plessey Company Limited, Ilford, England
[22] Filed: Aug. 7, 1970
[21] Appl. No.: 62,069

[52] U.S. Cl. ........................................... 60/13, 123/119 CE
[51] Int. Cl. ................................................. F02b 37/00
[58] Field of Search ........................... 60/13; 123/119 CE

[56] References Cited

UNITED STATES PATENTS

| | | | |
|---|---|---|---|
| 2,633,698 | 4/1953 | Nettel | 60/13 |
| 2,898,731 | 8/1959 | Barr | 60/13 |
| 3,096,615 | 7/1963 | Zuhn | 60/13 |
| 2,585,029 | 2/1952 | Nettel | 60/13 |
| 2,608,051 | 8/1952 | Nettel | 60/13 |
| 3,423,927 | 1/1969 | Scherenberg | 60/13 |
| 3,513,929 | 5/1970 | Dae Sik Kim | 60/13 |
| 2,580,591 | 1/1952 | Pouit | 60/13 |

Primary Examiner—Carlton R. Croyle
Assistant Examiner—Warren Olsen
Attorney—Scrivener, Parker, Scrivener and Clarke

[57] ABSTRACT

To enable achievement, in an I.C. engine having an exhaust-driven turbo-charger, of a desired booster rate, and thus of a desired overall compression ratio, more particularly at low engine speeds and even at the moment of starting, additional operating gas is made available for the turbo-charger by a by-pass from the outlet of the turbo-charger compressor to the inlet of the turbo-charger turbine downstream of the engine and the operation of an auxiliary burner for increasing the supply of driving power to the turbo-charger turbine, utilizing for its combustion such by-pass air and optionally also residual oxygen in the engine exhaust gas, and to further increase the amount for combustion air available in the engine, a dump valve is provided for venting at low engine speeds, the engine exhaust direct to atmosphere while isolating it from the gas flowing from the turbo-charger compressor via the auxiliary burner to the turbo charger turbine.

2 Claims, 2 Drawing Figures

SUPERCHARGING MEANS FOR INTERNAL-COMBUSTION ENGINES

This invention relates to internal-combustion engines which are equipped with an exhaust-driven turbo-compressor for the intake air also referred-to as a turbo charger, and it is more particularly though not exclusively intended for internal combustion engines of the kind hereinafter called Diesel engines, in which the fuel injected into the combustion air for each cylinder is ignited by the heat generated by the compression of combustion air.

The use of exhaust-driven turbo-chargers has, compared with turbo-chargers driven by the engine shaft, the advantage of limiting the reduction of the compressor speed and consequent reduction in boost pressure when the engine speed drops, particularly under heavy load. But even with the use of such exhaust driven turbochargers, the boost pressure is liable to drop quite appreciably at low engine speeds, and also when the engine, though running near maximum speed, works under a light load, because in both of these cases the available exhaust-gas energy is lower than when the engine runs at speed under maximum power conditions. Moreover an exhaust-driven turbo-charger does not supply any useful boost pressure at all under engine-starting conditions, when practically no exhaust-gas energy is available to drive the turbo-compressor. It is an object of the present invention to provide an improved arrangement for an exhaust-driven turbo-charger which in one or more of these conditions permits the available pressure output, and/or other power output generally of the turbo-charger to be increased.

According to the present invention an exhaust-driven turbo-charger has associated with it a combustion chamber equipped with fuel-injection and ignition means, this combustion chamber having an air inlet connection adapted to be fed from the compressed-air output of the turbo-charger, an outlet connection leading to the inlet of the exhaust-gas turbine which drives the turbo-charger, and a dump valve operable to establish a low-resistance outlet from the engine exhaust to atmosphere while isolating the engine, exhaust from the flow of gases passing via said combustion chamber to the inlet of the exhaust-gas turbine. Preferably starting means for the turbo-charger are additionally provided which permit the turbo-compressor to be accelerated to sufficient speed to provide the requisite air pressure for the operation of the combustion chamber to initiate self-sustaining operation of the turbo-charger and its associated combustion chamber with the help of fuel injected into the combustion chamber, independently of the provision of exhaust gas from the internal-combustion engine, in conjunction with fuel-injection means which are likewise capable of operating independently of the operation of the internal-combustion engine, thus permitting inlet air at a desired pre-compression to be made available to the internal-combustion engine from the moment the engine is being started.

It will be readily appreciated that, apart from the possibility of its use during engine-starting when it is combined with primary starting means for the turbo-charger, the arrangement of the invention, independently of the provision of such primary starting means, can also be used to supplement the energy of the exhaust gases from the I.C. engine supplied to the turbo-charger turbine when the engine runs at relatively low speeds, thus permitting to ensure full-speed operation of the turbo-charger and full boost pressure at such low engine speeds. Such an arrangement will clearly increase the torque available from the I.C. engine at such low engine speeds. On the other hand when the engine runs at full speed under a relatively light load, the speed of the turbo-charger was hitherto also liable to fall, thus causing a reduction in the compression ratio at which air is fed to the engine cylinders, due to the fact that the small amount of fuel fed to each cylinder load of air aspired into the I.C. engine under low-torque conditions results in a reduction of the temperature, and thus of the energy of the exhaust gases fed to the turbo-charger turbine. Moreover due to the fact that the mass flow of air into the I.C. engine is a function of engine speed, substantially independently of its load, very little, if any, air from the turbo-charger is available for feeding the combustion chamber to provide supplementary power for the turbo-charger when in these conditions the air intake of the engine is at its maximum. Consideration of the circumstances arising shows, however, that under these conditions, due to the low amount of fuel burnt in the engine at each cylinder stroke, a relatively large amount of excess air is available in the exhaust gas, and according to a preferred feature of the present invention this excess air is utilized for the combustion of additional fuel, and thus for the increase of the energy of the exhaust gas fed to the turbo-charger turbine. This is achieved by so arranging the combustion chamber of the present invention that it is traversed by the exhaust gases from the engine, which will thus ensure completion of the combustion of any particles of injected fuel for whose combustion the air supplied to the combustion chamber from the turbocharger is insufficient. Preferably in this case the combustion chamber is so constructed as to include an entry portion to which air from the turbo-charger compressor is supplied, and which is also equipped with the fuel injection and ignition means, so that combustion of the injected fuel is initiated in the virtual absence of any combustion products, this entry portion then merging with a further portion through which the exhaust gases from the I.C. engine are arranged to pass to the turbine inlet, and into which the combustion flame from the entry portion of the combustion chamber will extend, at least when oxygen contained in the engine exhaust gases is required for completing the combustion of the fuel injected into the combustion chamber.

In order that the invention may be more readily understood, two internal-combustion engines will now be described with respective reference to FIGS. 1 and 2 of the accompanying drawings, in which FIG. 1 is a schematic end elevation, combined with a flow and circuit diagram, of an engine equipped with an embodiment of the invention in which the combustion chamber is wholly arranged in a by-pass line from the compressor outlet to the engine-exhaust line, while FIG. 2 similarly illustrates another embodiment, in which the combustion chamber is arranged to be traversed by the flow of exhaust gases from the engine.

Referring now first to FIG. 1, a Diesel internal combustion engine 1 is equipped with an electric starter-and-generator unit 2. Combustion air from an environmental air inlet 4 is fed to the engine via an air inlet line 3 leading to an inlet manifold 2a. Before reaching the inlet line the air passes through, and is compressed by, the blower or compressor part 5 of a turbo-charger to whose turbine 6 exhaust gases, collected by an exhaust manifold 2b of the Diesel engine 1, are conducted by an exhaust line 7. After having yielded further energy in the turbine 6, the exhaust gases are discharged through an exhaust outlet 8 via a heat exchanger 26, and which utilizes heat from the exhaust gases to heat the engine-input air coming from the compressor part 5 of the turbo-charger. Both the starter-and-generator unit 2, and an electric storage battery for co-operation with it are connected to a start-control unit 11.

In order to enable the supply of gas for the operation of the turbo-charger turbine 6 from the exhaust manifold 2b of the diesel engine 1 to be supplemented or replaced by an alternative supply, the exhaust line 7 is connected to the outlet of a combustion chamber 13 which is arranged in a by-pass duct 12. This bypass duct leads from the air inlet line 3 between the outlet of the turbo-charger compressor 5 and the inlet manifold 2a of the Diesel engine 1 to the engine-exhaust line 7 upstream of the turbo-charger turbine 6. The combustion chamber 13 is equipped with an injection nozzle 14, to which fuel from a fuel pump 15 driven by the turbo-charger unit 5, 6, can be admitted under the control of a valve device 16. This valve device includes a solenoid valve controlled electrically from the start-control unit 11, in response, for example, to a speed signal from the turbo-charger. In addition the combustion chamber 13 is equipped with an electric ignition device 17, by which the fuel injected through the nozzle 14 can be ignited. This ignition device is likewise controlled from the start-control unit 11, and the latter is preferably also arranged to so control automatically the rate of fuel supply to the combustion chamber 13 as to limit the temperature of the combustion gas to an acceptable maximum of, for example, 950° K, and to also limit the turbo-charger speed to a safe maximum. Finally the turbo-charger unit 5, 6 is equipped with a combined electric motor/generator unit 18. This motor/generator unit is so controlled by the start-control unit 11 that at the beginning of a starting operation it is supplied with current from the storage battery 10 to act as a motor driving the turbo-charger unit, and that it will supply current to charge the battery and/or to supplement current delivered by the battery as soon as sufficient driving power for the turbine 6 is available from the combustion chamber 13.

In order to prevent, during the cranking-up period, the back pressure in the engine 1 from rising to the pressure applied to the turbo-compressor turbine 6, the exhaust line 7 coming from the exhaust manifold 23 is preferably equipped with a dump valve 34, illustrated as operated by a solenoid 134. When the solenoid is energized under the control of start-control unit 11, the valve 34 moves from the position shown in full lines to the position shown in broken lines, in which it opens an outlet 38 from the exhaust line 7 to atmosphere bypassing the turbine 6, while the exhaust line is at the same time isolated by the valve 34 from the inlet side of the turbine 6 and from the duct 12 containing the combustion chamber 13. When the engine has been started and exhaust gases from the engine reach the exhaust line 7, the start-control unit 11 will de-energize the solenoid 134 causing it to restore the dump valve 34 to its position shown in full lines.

In order to isolate the engine-inlet line 3 and the engine-exhaust line 7 from each other during normal running of the Diesel engine, a valve 19 may be interposed in the line 12 containing the combustion chamber 13. This valve 19 may be arranged for manual operation, or it may be arranged to be so operated automatically, for example by the start-control unit 11, that it is open only as long as fuel is supplied to the injection nozzle 14.

It will be observed that the turbo-charger unit 5, 6 is in operation not only during the starting period of the Diesel engine, but during the whole running time of the latter. For this reason the provision of the motor/generator unit 18, which is driven by the turbo-charger turbine 6, will in many cases make it unnecessary to provide an electric generator driven by the Diesel engine itself. Therefore the starter unit 2 for the Diesel engine proper can be simplified because it need not be adapted to generate, or be combined with, means for generating electricity to charge the battery 10. Moreover, when operating to warm up the Diesel engine prior to starting it, and after the starting of the Diesel engine, the turbo-charger is also available as a source of power for the operation of auxiliary apparatus.

The exhaust gases from the turbo-charger turbine 6 may also be utilized direct or, as shown, through the heat exchanger 26 to warm, when required, the air supplied to an air-pressurization and air-conditioning system to which fresh air is supplied by a second turbo-blower 25 also driven by the turbine 6 of the turbo-charger 6, 7.

Figure 2:
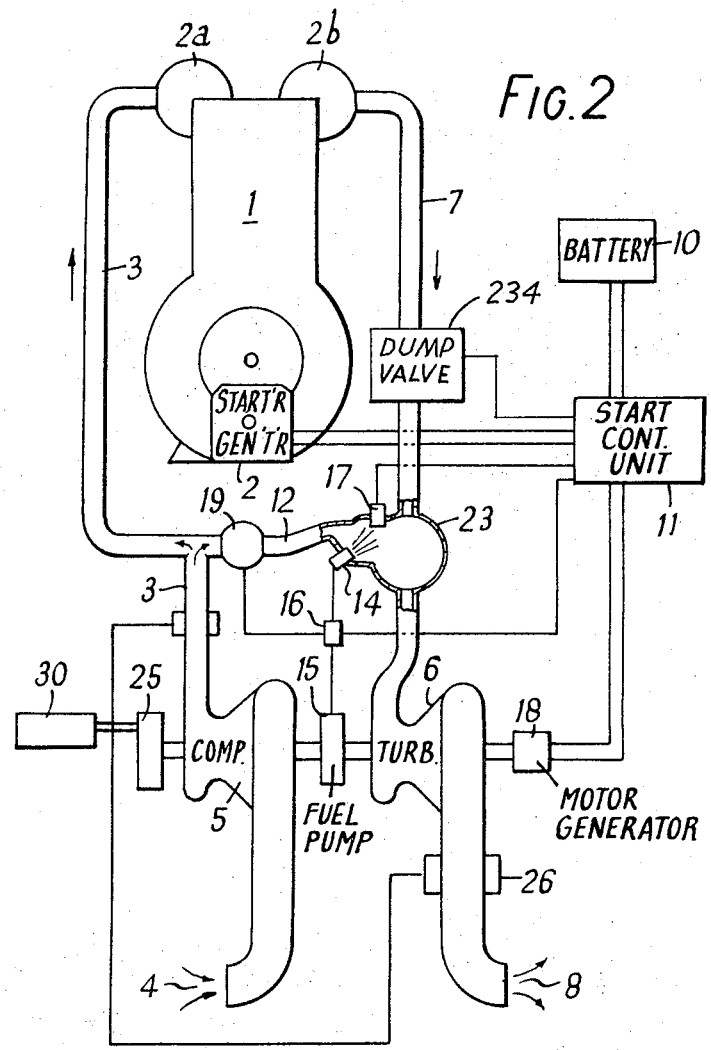

In the alternative embodiment illustrated in FIG. 2, those parts whose function has not been changed from FIG. 1, are indicated by the same reference numbers, so that it will suffice to describe those parts whose functions have been modified. The principal difference between the two embodiments consists in the fact that the combustion chamber 13 of the embodiment illustrated in FIG. 1, which is wholly contained in the by-pass line 12, has been replaced in FIG. 2 by a modified combustion chamber 23. The latter has an entry portion which contains the fuel-injection nozzle 14 and the ignition device 17, and which constitutes the end portion of the by-pass line 12, while the remainder of the combustion chamber 23 forms a portion of the exhaust line 7 that leads from the exhaust manifold 2a of the Diesel engine to the inlet of the turbo-compressor turbine 6. The exhaust gases coming from the Diesel-exhaust manifold 2b therefore traverse the last-mentioned portion of the combustion chamber. Operation conditions in which the amount of air reaching the combustion chamber 23 through the by-pass line 12 is insufficient to complete the combustion of the fuel injected through the nozzle 14 and in which the exhaust gas coming from the exhaust manifold 2b has a relatively large residual oxygen content, — for example when the engine runs under a light load so that only a small amount of fuel is injected into each cylinder charge of air, the addition of these exhaust gases to the air coming from the by-pass line 12 will keep the temperature in the combustion chamber within acceptable limits, while the oxygen content of the said exhaust gases ensures completion of the combustion of the fuel injected through the nozzle 14. This effect may be utilized not only to prevent under light engine loads a reduction of the boost ratio of the turbo-compressor 5 but also, if desired, to ensure the availability of electric power from the motor generator unit 18 and/or the availability of power for driving auxiliaries. A dump valve 234 similar to the valve 34 of FIG. 1 is also provided in the embodiment of FIG. 2.

It will readily be appreciated that the invention is not limited to all the features described with reference to either of the Figures of the accompanying drawing that, for example, a valve similar to valve 31 of FIG. 1 may also be used in the embodiment of FIG. 2. The but may be said to consist essentially in the addition of a dump valve operable to relieve the engine exhaust of the turbine-inlet pressure to the combination of an exhaust-driven turbo-charger for the inlet air of an internal-combustion engine, with a by-pass duct permitting some of the compressor-output air to be diverted to the inlet of the gas-turbine, in conjunction with means for utilizing this by-pass air for the combustion of additional fuel to increase, or prevent a decrease of, the operating speed of the turbo-charger, at least under certain operating conditions. The addition of the dump valve to this combination of features permits, the air mass per stroke of the engine to be increased, and thereby more fuel to be burned in the engine to obtain an increase in engine torque. The embodiment described hereinabove can be used to make additional take-off power available on the turbo-charger shaft for other uses, and they also permit the operation of the turbo-charger as a power unit even when the engine is stationary. The engine design may also be changed, because while in a conventional turbo-charger engine the range of compression ratios varies from a minimum at standstill of the engine to a maximum, so that the compression ratio of the engine itself must be so chosen as to enable the engine to be started with compression as low as its aspirated (non-boosted) compression ratio, the describe apparatus embodying the invention permits the compression ratio to be kept substantially constant. Moreover, in compression-ignited engines the achievement of self-ignition temperature is also very sensitive to ambient temperature and crank speed, and the importance of these problems is greatly reduced by the present invention.

When starting an engine equipped with a turbo-charger system according to a suitable embodiment of the present invention, the turbo-charger itself can be started, prior to the engine, by any form of stored energy, and then be used to provide a larger supply of stored energy, for subsequent cranking of the engine and other uses. While the starting of the turbo-compressor may be effected by hand cranking, a power-operated starting system is preferred, and while starting is preferably effected electrically in the manner described it may alternatively, for example, be effected, as indicated in chain-dotted lines in FIG. 1, by a pressure reservoir 31 which, during normal running of the engine and turbo-compressor, is charged by the turbo-compressor via a non-return valve 32, and from which by opening a solenoid valve 33 under the control, for example, of the start-control unit 11, a flow of air to operate the turbine 6 of the turbo-compressor can be derived.

Due to the provision of a high overall compression ratio already at the starting of the Diesel engine, the amount of cranking necessary is also greatly reduced, and in practice it has been found possible to start the engine by rotating it through as little as one cylinder intake and compression stroke. Moreover the engine was found capable of accepting load almost immediately it starts, even at very low ambient temperature, while in an existing well-developed 250 h.p. Diesel engine it was found that over twenty minutes were required to get throttle response at an ambient temperature of −26° C. Furthermore when the turbo-compressor unit in the system according to the invention is allowed to run for a certain time prior to the starting of the I.C. engine proper, the large quantities of hot exhaust gas of the gas turbine of the turbo-charger can be used for environmental and machinery heating, thus further facilitating the eventual starting of the engine.

Tests have been carried out on an engine which before incorporation of the apparatus embodying the invention was rated to produce 250 h.p. at 2,100 r.p.m. These tests have shown that the torque available at 800 r.p.m. could be increased by the incorporation of such apparatus by as much as 80 percent. On the other hand calculation and tests have shown that by reducing the compression ratio of the engine itself below that ensuring the achievement of the requisite minimum compression ratio for starting purposes without boost, the design performance of the engine can be improved by over 25 percent while at the same time also improving the efficiency. When the engine is installed in a vehicle, the increase of the available torque at lower engine speeds enables the number of gear-changing steps to be reduced, and/or significantly smaller engines will achieve equivalent vehicle performance.

Tests and calculations have also shown the possibility of significant improvement in engine combustion and the achievement of a cleaner exhaust at the engine-limiting temperature.

What we claim is:

1. An arrangement for increasing the mass of combustion air supplied per revolution to an internal-combustion engine having an inlet and an exhaust, more particularly to a Diesel engine as hereinabove defined, which comprises in combination: (a) a turbo-charger including a turbine so arranged as to be normally driven by exhaust gas from the exhaust of each engine and further including a dynamic compressor driven by said turbine for supplying charging air under pressure to the inlet of said engine; (b) a branch duct leading from a point between said compressor and said inlet to a junction point between said exhaust and said turbine and including a combustion chamber equipped with fuel-injection and ignition means, the connection from said exhaust to said junction point having an atmospheric outlet; (c) a dump valve having a normal position in which it closes said atmospheric outlet and having an operative position in which it permits communication of said exhaust with said outlet but isolates said exhaust and outlet from said inlet and from said combustion chamber, (d) an operating device for the dump valve, and (g) a start-control unit operable to control a starting sequence of the engine, said start-control unit including means which upon such operation of the unit cause said operating device to move the dump valve to said operative position and which subsequently, upon starting of the engine, cause that operating valve to restore the dump valve to its normal position.

2. A device as claimed in claim 1, which includes an isolating valve operable to cut-off flow through the branch duct during normal running of the engine, said start-control unit including automatic control means operable to open said isolating valve only as long as fuel is supplied to said injection means of the combustion chamber fed with air from the turbo compressor.

* * * * *